US010220340B2

(12) United States Patent
Motomura et al.

(10) Patent No.: US 10,220,340 B2
(45) Date of Patent: Mar. 5, 2019

(54) LAMINATED NONWOVEN FABRIC AND AIR PURIFIER

(71) Applicant: PANASONIC INTELLECTUAL PROPERTY MANAGEMENT CO., LTD., Osaka (JP)

(72) Inventors: Koji Motomura, Osaka (JP); Takahiko Murata, Osaka (JP); Hiroto Sumida, Nara (JP); Takahiro Kurokawa, Osaka (JP); Takatoshi Mitsushima, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 134 days.

(21) Appl. No.: 14/870,606

(22) Filed: Sep. 30, 2015

(65) Prior Publication Data
US 2016/0199766 A1    Jul. 14, 2016

(30) Foreign Application Priority Data

Jan. 9, 2015 (JP) .................................. 2015-003121

(51) Int. Cl.
*B01D 53/22* (2006.01)
*B01D 39/18* (2006.01)
(Continued)

(52) U.S. Cl.
CPC ......... *B01D 39/18* (2013.01); *B01D 39/1623* (2013.01); *B32B 5/022* (2013.01);
(Continued)

(58) Field of Classification Search
CPC .............. B01D 39/18; B01D 2239/065; B01D 2239/1233; B01D 39/1623; B32B 5/22;
(Continued)

(56) References Cited

U.S. PATENT DOCUMENTS 4,536,911 A * 8/1985 Demetriades ......... A47L 11/164
15/230.12
5,443,606 A * 8/1995 Hassenboehler, Jr. ......................
B01D 39/163
55/486
(Continued)

FOREIGN PATENT DOCUMENTS

CN      104066492 A    9/2014
JP      2006-069141 A  3/2006
(Continued)

OTHER PUBLICATIONS

Chinese Search Report dated Jan. 16, 2019 for the related Chinese Patent Application No. 201510908938.8.

*Primary Examiner* — Anthony R Shumate
(74) *Attorney, Agent, or Firm* — Pearne & Gordon LLP (57) ABSTRACT

A laminated nonwoven fabric includes a first nonwoven fabric that comprises first fibers, and a second nonwoven fabric that comprises second fibers. The second nonwoven fabric is laminated on the first nonwoven fabric. An average fiber diameter D1 of the first fibers and an average fiber diameter D2 of the second fibers satisfy a relation of D1>D2. In viewed from a side of a principal surface of the second nonwoven fabric being not opposed to the first nonwoven fabric, a total area of first portions of the second fibers superimposed on the first fibers and existing on the nearer side than the first fibers is larger than a total area of second portions of the second fibers existing and superimposed on voids S of the first nonwoven fabric formed of the first fibers.

11 Claims, 7 Drawing Sheets

(51) Int. Cl.
*B32B 5/02* (2006.01)
*B32B 5/24* (2006.01)
*B32B 5/26* (2006.01)
*B32B 5/08* (2006.01)
*B32B 5/22* (2006.01)
*B01D 39/16* (2006.01)
*B32B 5/12* (2006.01)

(52) U.S. Cl.
CPC ............... *B32B 5/08* (2013.01); *B32B 5/22* (2013.01); *B32B 5/245* (2013.01); *B32B 5/26* (2013.01); *B01D 2239/065* (2013.01); *B01D 2239/1233* (2013.01); *B32B 5/12* (2013.01); *B32B 2250/20* (2013.01); *B32B 2262/02* (2013.01); *B32B 2262/0223* (2013.01); *B32B 2262/0238* (2013.01); *B32B 2262/0246* (2013.01); *B32B 2262/0253* (2013.01); *B32B 2262/0261* (2013.01); *B32B 2262/0276* (2013.01); *B32B 2262/0292* (2013.01); *B32B 2262/062* (2013.01); *B32B 2262/101* (2013.01); *B32B 2262/14* (2013.01); *B32B 2305/026* (2013.01); *B32B 2305/28* (2013.01); *B32B 2307/718* (2013.01)

(58) Field of Classification Search
CPC .............. B32B 5/08; B32B 2262/0223; B32B 2262/062; B32B 2262/0238; B32B 2250/20; B32B 2262/02; B32B 2262/0246; B32B 5/022; B32B 2262/101; B32B 2262/0292; B32B 2307/718; B32B 2305/026; B32B 5/12; B32B 5/245; B32B 2262/0253; B32B 2262/14; B32B 5/26; B32B 2262/0276; B32B 2262/0261; B32B 2305/28

See application file for complete search history.

(56) References Cited

U.S. PATENT DOCUMENTS

| | | | | |
|---|---|---|---|---|
| 5,672,188 | A | * | 9/1997 | Choi .................... B01D 39/083 55/485 |
| 5,753,343 | A | * | 5/1998 | Braun .................... A62B 23/02 428/141 |
| 2008/0045917 | A1 | * | 2/2008 | Autran ............... A61F 13/51464 604/385.22 |
| 2010/0133173 | A1 | * | 6/2010 | Inagaki ............... B01D 39/1623 210/504 |
| 2011/0114554 | A1 | * | 5/2011 | Li ....................... B01D 39/1623 210/493.5 |
| 2011/0196325 | A1 | * | 8/2011 | Isele .................... A61F 13/4942 604/365 |
| 2011/0256372 | A1 | * | 10/2011 | Hauber .................... B32B 3/04 428/218 |

FOREIGN PATENT DOCUMENTS

| | | |
|---|---|---|
| JP | 2009-233550 A | 10/2009 |
| JP | 2013-244452 A | 12/2013 |
| WO | 2008/130019 A1 | 10/2008 |
| WO | 2013/121733 A1 | 8/2013 |

* cited by examiner

LAMINATED NONWOVEN FABRIC AND AIR PURIFIER

CROSS REFERENCE TO RELATED APPLICATION

This application is based on Japanese Patent Application (No. 2015-003121) filed on Jan. 9, 2015, the contents of which are incorporated herein by reference.

BACKGROUND

1. Technical Field

The present invention relates to a laminated nonwoven fabric, and the invention relates to a laminated nonwoven fabric used for, for example, a filter medium of air purifier.

2. Description of the Related Art

Nonwoven fabrics as a filter medium to be used for air purifiers and the like are required to have as basic performances high long-term dust collection efficiency (dust-capturing capability) and low pressure loss (resistance when a fluid passes through the nonwoven fabric). However, these are reciprocal properties, so that it is difficult to make the both compatible with each other. For example, in order to improve the dust collection efficiency, a basis weight (density) of the nonwoven fabric has only to be increased. But, if the basis weight is increased, a flow channel of the fluid becomes small. Thus, the resistance to the fluid becomes large, so that the pressure loss becomes high. Furthermore, as the dust collection proceeds, whereby a void of the nonwoven fabric becomes small, though the dust collection efficiency is more enhanced, the pressure loss increases, too. Since the dust collection is achieved due to the matter that the dust-containing fluid passes through an interior of the nonwoven fabric, in order to allow the fluid to pass through an interior of the nonwoven fabric with high pressure loss, it is necessary to increase a motor output (sucking force) of an air purifier or the like. For that reason, there are encountered such problems that the electric power for use becomes large; and that the noise becomes large. In the case where an air purifier or the like is placed for household use in a room, attention to the noise is more important.

In order to enhance the dust collection efficiency, WO2008/130019 teaches that two kinds of fibers having a different average fiber diameter from each other are uniformly entangled.

In addition, in WO2013/121733, first nanofibers having a large average fiber diameter and second nanofibers having a smaller average fiber diameter than the first nanofibers are used and arranged on a base material such that a basis weight of the first nanofibers is smaller than a basic weight of the second nanofibers. According to this, it is taught that not only the dust collection efficiency is improved, but also an increase of the pressure loss is suppressed.

However, according to the method of WO2008/130019, the pressure loss is liable to become large. Even by the method of WO2013/121733, it may not be said that it is satisfactory to make both high dust collection efficiency and low pressure loss compatible with each other.

SUMMARY

One aspect of the present invention is concerned with a laminated nonwoven fabric comprising a first nonwoven fabric including first fibers and a second nonwoven fabric including second fibers, the second nonwoven fabric being laminated on the first nonwoven fabric and having a principal surface (first surface) 2A and a second surface 2B, wherein an average fiber diameter D1 of the first fibers and the an average fiber diameter D2 of the second fibers satisfy a relation of (D1>D2); and when seen from the side of the principal surface 2A of the second nonwoven fabric not opposed to the first nonwoven fabric, in a prescribed region, a total area of portions 2Fa of the second fibers superimposed on the first fibers and existing on the nearer side than the first fibers is larger than a total area of portions 2Fb of the second fibers existing superimposed on voids S of the first nonwoven fabric formed of the first fibers.

Another aspect of the present invention is concerned with an air purifier comprising a sucking section of a gas, a discharging section of the gas, and the laminated nonwoven fabric as described above, wherein the laminated nonwoven fabric is arranged between the sucking section and the discharging section such that the principal surface 2A is opposed to the sucking section.

According to the present invention, it is possible to provide a laminated nonwoven fabric provided with high dust collection efficiency and low pressure loss.

DETAILED DESCRIPTION OF THE EXEMPLARY EMBODIMENTS

The laminated nonwoven fabric according to the present invention includes a first nonwoven fabric including first fibers and a second nonwoven fabric including second fibers, the second nonwoven fabric being laminated on the first nonwoven fabric, wherein an average fiber diameter D1 of the first fibers and an average fiber diameter D2 of the second fibers satisfy a relation of (D1>D2); and in viewed from a side of a principal surface 2A of the second nonwoven fabric being not opposed to the first nonwoven fabric, in a prescribed region, a total area of first portions 2Fa of the second fibers superimposed on the first fibers and existing on the nearer side than the first fibers is larger than a total area of second portions 2Fb of the second fibers existing and superimposed on voids S of the first nonwoven fabric formed of the first fibers.

According to this, the second fibers having a small average fiber diameter capture a dust in the neighborhood of the first fibers, and therefore, even when used over a long period of time, the void of the first nonwoven fabric is held. For that reason, an increase of pressure loss is suppressed, and a period of endurance becomes long. Furthermore, in view of the fact that the laminated nonwoven fabric includes the second fibers having a smaller average fiber diameter, the dust collection efficiency is enhanced.

For example, among the first portions 2Fa of the second fibers, a total area of portions of the second fibers arranged along a length direction of the first fibers is larger than a total area of portions of the second fibers arranged along a direction perpendicular to the length direction of the first fibers. This is because the effect for suppressing an increase of pressure loss is liable to become higher.

For example, D1 and D2 satisfy a relation of (D2≤D1/10). For example, D2 is less than 1 μm. This is because a surface area of the second nonwoven fabric becomes large, whereby the dust collection effect is more enhanced. In addition, in the case of accumulating the second fibers on the first nonwoven fabric by utilizing an electrostatic force, the second fibers become light, whereby it becomes easy to arrange the second fibers so as to be superimposed on the first fibers.

For example, the second nonwoven fabric further include third fibers. In this case, an average fiber diameter D3 of the third fibers satisfies a relation of (D2<D3<D1); and that the second fibers are arranged between the first fibers and the third fibers. In addition, when seen from the side of the principal surface 2A, in a prescribed region, a total area of portions of the third fibers superimposed on the first fibers and existing on the nearer side than the first fibers is smaller than a total area of portions of the third fibers existing superimposed on the voids S of the first nonwoven fabric. In view of the fact that the third fibers thicker than the second fibers are arranged so as to be superimposed on the voids S, it becomes possible for the third fibers to capture the dust going to pass through the void S prior to passing therethrough. According to this, even when used over a long period of time, the void S is liable to be held, and therefore, an increase of pressure loss and a lowering of dust collection efficiency become easy to be suppressed. As a result, the period of endurance of the laminated nonwoven fabric becomes longer.

For example, D2 is 100 nm or more and less than 500 nm; and that D3 is 500 nm or more and less than 1,000 nm. This is because the surface area of the second nonwoven fabric becomes long, whereby the dust collection efficiency is more enhanced.

For example, the laminated nonwoven fabric further includes a porous protective layer provided on the side of the principal surface 2A of the laminated nonwoven fiber. This is because the period of endurance of the laminated nonwoven fabric becomes longer.

In addition, the air purifier includes a sucking section for sucking gas, a discharging section for discharging the gas, and the above-described laminated nonwoven fabric, wherein the laminated nonwoven fabric is arranged between the sucking section and the discharging section so that the principal surface 2A is opposed to the sucking section. Such an air purifier is low in operation sound and excellent in dust collection efficiency.

Specific embodiments of the laminated nonwoven fabric according to the present invention are hereunder explained by reference to the accompanying drawings.

Figure 1:
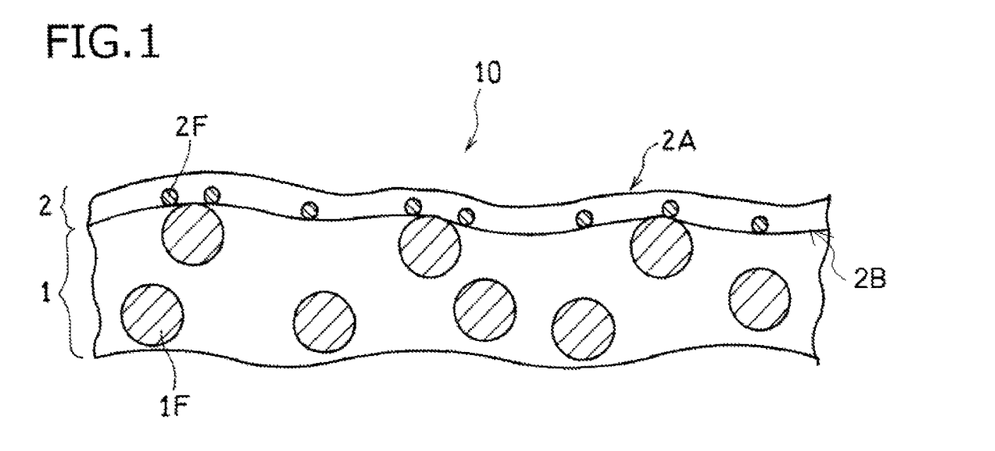
FIG. 1 is a cross-sectional view schematically illustrating a laminated nonwoven fabric according to an embodiment of the present invention.

FIG. 1 is a cross-sectional view schematically illustrating a laminated nonwoven fabric according to an embodiment of the present invention. A laminated nonwoven fabric 10 comprises a first nonwoven fabric 1 including first fibers 1F and a second nonwoven fabric 2 laminated on a surface of the first nonwoven fabric 1 and including second fibers 2F. That is, the first fibers 1F and the second fibers 2F constitute the first nonwoven fabric and the second nonwoven fabric, respectively as aggregates of the respective fibers. The first nonwoven fabric 1 and the second nonwoven fabric 2 may be formed in a separable state as a single fabric, respectively, or may be formed in a non-separable state.

In the first nonwoven fabric 1, for example, the first fibers 1F account for, for example, 95% by mass or more of the whole, and other fibers may account for a balance of less 5% by mass. The other fibers may be the second fibers 2F, or may be fibers other than the first fibers 1F and the second fibers 2F. Similarly, in the second fabric 2, for example, a total sum of the second fibers 2F and third fibers 3F as described later accounts for, for example, 95% by mass or more of the whole, and other fibers may account for a balance of less 5% by mass. The other fibers may be the first fibers 1F, or may be fibers other than the first fibers 1F, the second fibers 2F, and the third fibers 3F. In other words, in a thickness direction of the laminated nonwoven fabric 10, a region where the first fibers 1F account for, for example, 95% by mass or more can be considered as the first nonwoven fabric, and a region where a total sum of the second fibers 2F and the third fibers 3F account for, for example, 95% by mass or more can be considered as the second nonwoven fabric.

The average fiber diameter D1 of the first fibers 1F is larger than the average fiber diameter D2 of the second fibers 2F, and a relation of (D1>D2) is satisfied. Namely, in the laminated nonwoven fabric 10, the second fibers 2F having a small average fiber diameter are unevenly distributed on the side of one principal surface of the first nonwoven fabric, and hence, a surface area on the side of one principal surface is large. For that reason, on the occasion of allowing the dust to pass from the side of the second nonwoven fabric, the dust collection efficiency is enhanced as compared with the case where the second fibers 2F coexist in an interior of the first nonwoven fabric.

The average fiber diameter as referred to herein is determined as an average value of diameters obtained by measurement in one place with respect to each of arbitrary ten fibers. The fiber diameter as referred to herein means a diameter of a cross section perpendicular to the length direction of fiber. In the case where such a cross section is not circular, a maximum diameter may be considered as the diameter.

Figure 2:
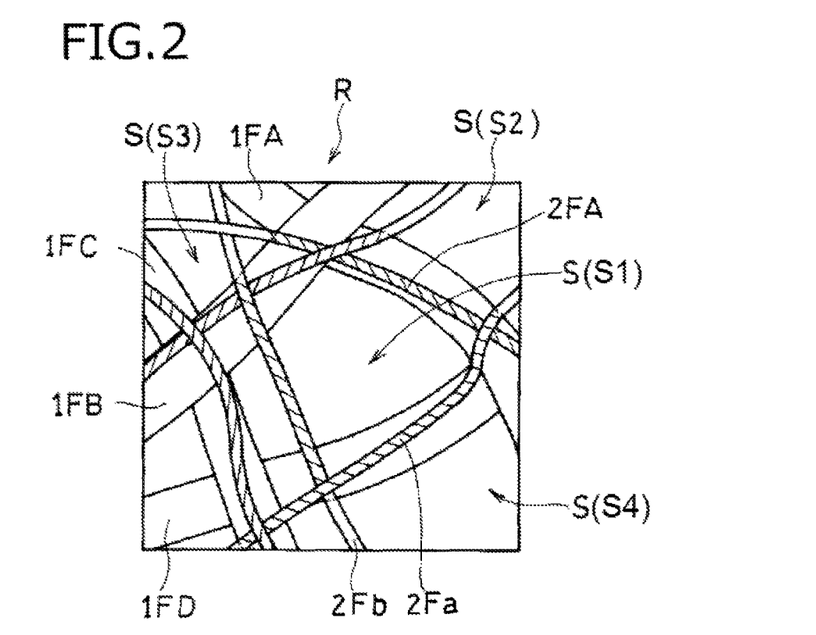
FIG. 2 is a top view schematically illustrating a laminated nonwoven fabric according to an embodiment of the present invention.

Furthermore, in the laminated nonwoven fabric 10, when seen from the side of the principal surface 2A of the second nonwoven fabric 2 not opposed to the first nonwoven fabric 1, in a prescribed region, a total area A2a of the portions 2Fa of the second fibers superimposed on the first fibers 1F and existing on the nearer side than the first fibers 1F is larger than a total area A2b of the portions 2Fb of the second fibers existing superimposed on the voids S of the first nonwoven fabric 1 formed of the first fibers 1F (see FIG. 2). Namely, when seen from the side of the main plan 2A, the second fibers 2F are unevenly distributed so as to be superimposed on the side of one principal surface of the first nonwoven fabric of the first fibers 1F.

The prescribed region as referred to herein is, for example, a region including at least the first fibers 1F and the second fibers 2F when the laminated nonwoven fabric 10 is seen from the side of the principal surface 2A. Specifically, a photograph of the principal surface 2A of the laminated nonwoven fabric 10 is taken from a normal direction of the principal surface 2A. From a range of the taken photograph, a region R surrounded by a square whose one side has a length of about 5 to 10 times of D1 can be defined as the prescribed region.

That is, the laminated nonwoven fabric according to the present invention is characterized in that a proportion of the portions 2Fa of the second fibers superimposed on the first fibers 1F and existing on the nearer side than the first fibers 1F is larger than a proportion of the portions 2Fb of the second fibers existing so as to traverse the void S of the first nonwoven fabric (2Fa>2Fb). The majority of the dust is absorbed by the second fiber 2Fa existing superimposed on the first fibers 1F, and therefore, even in the case of using over a long period of time, the void S is held as it is, and the increase of pressure loss is suppressed. For example, in the case of performing the measurement with a measuring machine in conformity with the regulations of JIS B9908, Form 1, an initial pressure loss of the laminated nonwoven fabric 10 is, for example, about 5 to 50 Pa.

From the viewpoint of suppressing the increase of pressure loss, the area A2$a$ and the area A2$b$ satisfy a relation of (A2$a$>2·A2$b$), and especially a relation of (A2$a$>7·A2$b$). For example, the area A2$b$ satisfies a relation of (A2$b$>0). This is because as described later, in the case of further arranging third fibers, it is easy to suppress inversion of the third fibers into an interior of the void S. The portions 2Fa of the second fibers may or may not come into contact with the first fibers 1F.

The void S is two-dimensionally prescribed when seen from the principal surface 2A and is a first inlet when the dust passes through a space of the first nonwoven fabric. The void S is, for example, defined as follows.

First of all, among the first fibers 1F included in the prescribed region R as determined by the above-described method, one or more fibers having a distinct outer edge are selected. At this time, the total area of the selected first fibers 1F is set to, for example, 50% or less of the area of the region R. Assuming that the second fibers 2F are absent, the region R can be separated into the selected first fibers 1F and other region. This region other than the first fibers 1F is defined as the void S.

Specifically, for example, as illustrated in FIG. 2, the prescribed region R of a square whose one side has a length of about 7 times of D1 is determined. Among the first fibers 1F included in the region R, four first fibers 1FA to 1FD having a distinct outer edge and having a total area of 50% or less of the area of the region R are selected. According to this, the region R is roughly classified into the first fibers 1FA to 1FD and other portions. Then, the other portions than the first fibers 1FA to 1FD are designated as voids S1 to S4. At this time, very narrow voids may be considered to be not a void.

The areas A2$a$ and A2$b$ are obtained by distinguishing the portions 2Fa of the second fibers superimposed on the first fibers 1FA to 1FD and existing on the nearer side than the first fibers and the portions 2Fb of the second fibers existing superimposed on the voids S1 to S4 from each other and calculating the respective total areas.

Among the portions 2Fa of the second fibers, a total area A2$ap$ of portions 2Fap of the second fibers arranged along a length direction of the first fibers 1F is larger than a total area A2$av$ of portions 2Fav of the second fibers arranged along a direction perpendicular to the length direction of the first fibers 1F (A2$ap$>A2$av$). In this case, it may be said that a proportion of the second fibers existing so as to traverse the void S is small, and even when used over a long period of time, the void S is liable to be held, and the increase of pressure loss is more suppressed. The area A2$ap$ and the area A2$av$ satisfy a relation of (A2$ap$>5·A2$av$).

Figure 3:
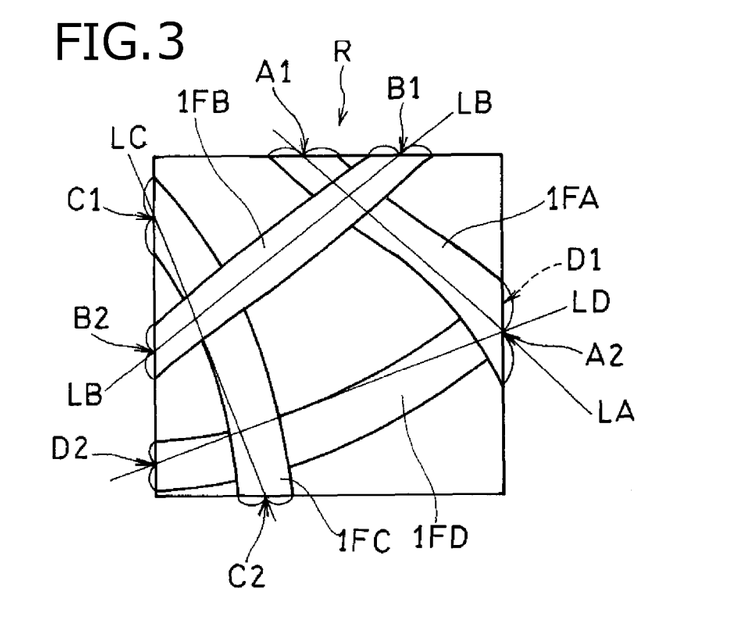
FIG. 3 is a top view in which second fibers 2F in FIG. 2 are omitted.
Figure 4:
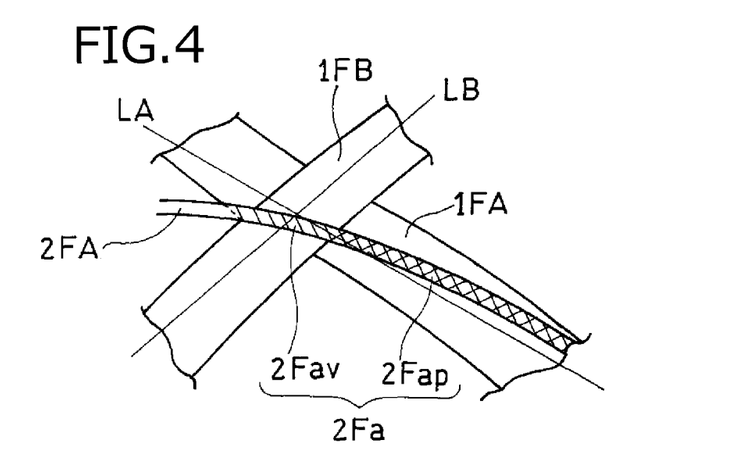
FIG. 4 is a top view in which a part of FIG. 2 is enlarged.

The portions 2Fap and 2Fav of the second fibers can be defined as follows by reference to FIGS. 3 and 4. FIG. 3 is a view in which the second fibers 2F in FIG. 2 are omitted. FIG. 4 is a view in which among the fibers illustrated in FIG. 2, only the first fibers 1FA and 1FB and a second fiber 2FA existing superimposed on the first fiber 1FA are illustrated.

First of all, in the neighborhoods of ends of the first fibers 1F in the region R, points each dividing the width of the first fiber 1F (length in a direction perpendicular to the length direction) into two equal parts are determined. In FIG. 3, the points are A1 and A2, B1 and B2, C1 and C2, and D1 and D2, respectively. Straight lines L each connecting those points are drawn (straight lines LA to LD). When the portion 2Fa of the second fiber existing superimposed on the first fiber 1F is considered as one curve, and its tangent is drawn, the portion 2Fa of the second fiber in which an angle θ formed between the tangent and the straight line L is 0 to 40° is defined as the portion 2Fap of the second fiber arranged along the length direction of the first fiber 1F.

Meanwhile, the portion 2Fa of the second fiber in which the angle θ is larger than 40° is defined as a portion 2Fav of the second fiber arranged along the direction perpendicular to the length direction of the first fiber 1F. In the case where the portion 2Fa of the second fiber exists spreading over the first fibers 1FA and 1FB (see FIG. 4), the above-described definition is applied with respect to the nearest first fiber. In the case of FIG. 4, the portion 2Fa of the second fiber includes the portion 2Fap arranged along the length direction of the first fiber 1FA and the portion 2Fav arranged along the direction perpendicular to the length direction of the first fiber 1FB.

Figure 5:
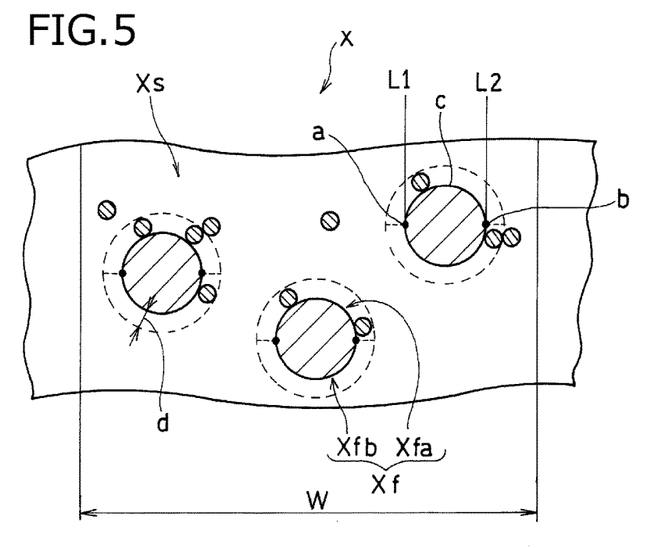
FIG. 5 is a cross-sectional view schematically illustrating a laminated nonwoven fabric according to another embodiment of the present invention.

In addition, in the case of seeing the vertical cross section against the principal surface of the laminated woven fabric, the relation of (2Fa>2Fb) that characterizes the laminated nonwoven fabric according to the present invention can also be prescribed by reference to FIG. 5.

With respect to the vertical cross section against the principal surface of the laminated nonwoven fabric, a prescribed region X where a width W is 5 to 10 times of D1 is determined. At least one of the first fibers 1F is allowed to be included in the region X. Subsequently, a doughnut-shaped region Xf having a fixed width d, which surrounds the periphery of the cross section of the first fiber 1F, is set. The width d is, for example, ⅕ of D1. In the region X, other region than the cross section of the first fiber 1F and the region Xf is defined as a region Xs.

Here, in the case where a proportion Rf of an area of the second fibers occupied per unit area in the region Xf is larger than a proportion Rs of an area of the second fibers occupied per unit area in the region Xs, the relation of (2Fa>2Fb) can be prescribed to be satisfied. Namely, in the region Xf, the second fibers exist in a dense state, whereas in the region Xs, the second fibers exist in a more coarse state than the former. From the viewpoint of suppressing the increase of pressure loss, the proportion Rf and the proportion Rs satisfy a relation of (Rf>2·Rs). In addition, from the same reason as that described above, the proportion Rs satisfies a relation of (Rs>0).

Furthermore, in the case of dividing the region Xf into a region Xfa on the side of the principal surface 2A and other region Xfb, from the viewpoint of the dust collection efficiency, a proportion Rfa of an area of the second fibers occupied per unit area in the region Xfa is larger than a proportion Rfb of an area of the second fibers occupied per unit area in the region Xfb. Namely, the second fibers exist in a larger proportion on the side of the principal surface 2A. The region Xfa can be prescribed as follows. First of all, straight lines L1 and L2, each of which is a perpendicular of the principal surface 2A and comes into contact with the first fiber, are drawn. Subsequently, contact points a and b of the straight lines L1 and L2 with the first fiber are connected, and a curve c is drawn on the side of the principal surface 2A. A region including this curve c is defined as the region Xfa.

Figure 6:
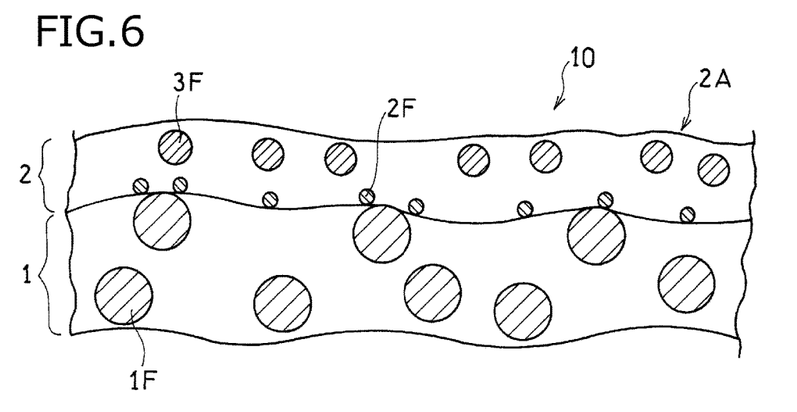
FIG. 6 is a cross-sectional view schematically illustrating a laminated nonwoven fabric according to a still another embodiment of the present invention.

The second nonwoven fabric 2 further includes third fibers 3F whose average fiber diameter D3 satisfies a relation of (D2<D3<D1) (see FIG. 6). In this case, the second fibers 2F are arranged in a larger proportion between the first fibers 1F and the third fibers 3F. In other words, a peak of the distribution of the second fibers 2F exists between the first fibers 1F and the third fibers 3F.

When seen from the side of the principal surface 2A, in the prescribed region R, a total area A3a of the third fibers 3Fa existing superimposed on the first fibers 1F is smaller than a total area A3b of the third fibers 3Fb existing superimposed on the voids S of the first nonwoven fabric (A3a<A3b). The area A3a and the area A3b can be calculated in the same way as that described above by substituting the second fibers with the third fibers. The area A3a and the area A3b satisfy a relation of (3·A3a<A3b).

In other words, in the third fibers 3F, a proportion of the portions 3Fb of the third fibers existing so as to traverse the void S of the first nonwoven fabric is larger than a proportion of the portions 3Fa of the third fibers existing superimposed on the first fibers 1F (3Fa<3Fb). Meanwhile, the third fibers 3F are not arranged in gaps among the first fibers 1F, namely an interior of a space of the first nonwoven fabric, as far as possible. This is because the increase of pressure loss is liable to be suppressed. The third fibers 3F may come into contact with the first fibers 1F.

It is permitted that the second fibers 2F are arranged among the first fibers 1F (interiors of spaces of the first nonwoven fabric). Such second fibers 2 is, for example, obtained by arranging the second fibers 2F on one principal surface of the first nonwoven fabric and then further arranging the third fibers 3F on the subject principal surface.

In view of the fact that the third fibers existing so as to be superimposed on the voids S but not arranged in the interior of the space of the first nonwoven fabric are included in a large proportion, it becomes possible for the third fibers to capture the dust going to pass through the space of the first nonwoven fabric prior to passing therethrough. According to this, even when used over a long period of time, the void S is liable to be held, and the increase of pressure loss becomes easy to be suppressed.

In addition, since the third fibers 3F have an average fiber diameter D3 larger than that of the second fibers 2F, it becomes possible to capture a large dust which cannot be captured by the second fibers 2F. For that reason, a load of the dust collection of the second fibers 2F is reduced, and the dust collection efficiency is more enhanced.

The respective fibers and respective nonwoven fabrics and the like are hereunder explained in detail.

[First Fibers]

A material of the first fibers 1F is not particularly limited, and examples thereof include cellulose and glass fibers. The average fiber diameter D1 of the first fibers 1F is larger than the average fiber diameter D2 of the second fibers 2F. The average fiber diameter D1 is, for example, 0.5 µm to 20 µm, and also, for example, 10 µm to 20 µm.

[First Nonwoven Fabric]

The first nonwoven fabric 1 has a role as a base material for holding the shape of the laminated woven fabric 10. For example, in the case of subjecting the laminated nonwoven fabric 10 to pleating, the first nonwoven fabric works as a base material, thereby holding the shape of a pleat.

In the case of performing the measurement with a measuring machine in conformity with the regulations of JIS B9908, Form 1, an initial pressure loss of the laminated nonwoven fabric is about 1 to 10 Pa. So long as the initial pressure loss of the first nonwoven fabric falls within this range, an initial pressure loss of the whole of the laminated nonwoven fabric is also suppressed, and therefore, an effect for unevenly distributing the second fibers, and moreover the third fibers is more liable to be exhibited.

The first nonwoven fabric 1 includes the first fibers. As described previously, in the first nonwoven fabric 1, the first fibers account for 95% by mass or more of the whole. Namely, the first nonwoven fabric 1 may include other fibers than the first fibers, for example, the second fibers 2F, or other fibers than the first fibers 1F and the second fibers 2F, in an amount of less than 5% by mass. The other fibers than the first fibers 1F and the second fibers 2F are not particularly limited and can be properly selected.

From the viewpoint of pressure loss, an average thickness of the first nonwoven fabric 1 is exemplary 20 to 500 µm and also exemplary 50 to 400 µm. The average thickness as referred to herein is, for example, an average value of thicknesses in arbitrary ten places of the nonwoven fabric. The thickness as referred to herein means a distance between the two principal surfaces of the nonwoven fabric. From the viewpoint of pressure loss, a basis weight of the first nonwoven fabric 1 is exemplary 10 to 100 g/m², and also exemplary 30 to 50 g/m².

The first nonwoven fabric has a three-dimensionally communicating space. As described previously, the void S is defined as a two-dimensional gap formed by a plurality of the first fibers; however, a proportion of the space (porosity) of the first nonwoven fabric is one of indexes expressing the size of the void S. Namely, it may be considered that the higher the porosity, the larger the void S is. The porosity is exemplary 40 to 70%. The porosity can be, for example, calculated according to the basis weight and thickness of the first nonwoven fabric and a specific gravity of the fibers that constitute the first nonwoven fabric. For example, in the case where the first nonwoven fabric is constituted of only the first fibers, the porosity is expressed according to the following equation:

Porosity={1−(Basis weight)/(Specific gravity of first fibers)·(Thickness)}·100

[Second Fibers]

A material of the second fibers 2F is not particularly limited, and examples thereof include polymers, such as polyacrylonitrile (PAN), polyvinylidene fluoride (PVDF), polyvinyl alcohol (PVA), polyvinyl acetate (PVAc), polyethersulfone (PES), polypropylene (PP), polyethylene terephthalate (PET), polyurethane, and nylon. These may be used solely or in combination of two or more kinds thereof. Above all, a polymer suitable for an electrostatic spinning method is applicable.

The average fiber diameter D2 of the second fibers is smaller than the average fiber diameter D1 of the first fibers. Above all, D2 is exemplary 1/10 or less of D1 (D2≤D1/10). In addition, D2 is exemplary 1/2,000 or more of D1. So long as D2 falls within this range, not only it becomes easier to arrange the second fibers 2F so as to be superimposed on the first fibers 1F, but also the surface area of the second nonwoven fabric can be made large. Specifically, the average fiber diameter D2 is exemplary less than 1 μm, and also exemplary less than 500 nm. In addition, the average fiber diameter D2 is exemplary 50 nm or more, and also exemplary 100 nm or more.

[Third Fibers]

A material of the third fibers 3F is not particularly limited, and for example, the same materials as those exemplified for the second fibers can be exemplified.

The average fiber diameter D3 of the third fibers satisfies a relation of (D2<D3<D1). So long as D3 falls within this range, while making it possible to capture a large-sized dust which is hardly captured by the second fibers 2F, the surface area of the second nonwoven fabric can be made large. For example, D2 may be 100 nm or more and less than 500 nm, D3 may be 500 nm or more and less than 1,000 nm, and D1 may be 1,000 nm or more. Above all, D3 is exemplary smaller than 1/5 of D1 (D3<D1/5) and exemplary larger than two times of D2 (D3>2·D2).

[Second Nonwoven Fabric]

The second nonwoven fabric 2 has a function to capture the dust. When seen from the side of the principal surface 2A, the second fibers 2F that constitute the second nonwoven fabric 2 are unevenly distributed so as to be superimposed on the first fibers 1F. Namely, the second fibers are arranged superimposed on the first nonwoven fabric without clogging the void S as an inlet of the dust, and therefore, even when used over a long period of time, the increase of pressure loss is suppressed. Furthermore, the second fibers exhibit high dust collection efficiency because the second fibers have a smaller average fiber diameter than the first fibers.

The second woven fabric 2 may include the third fibers 3F. A proportion of the third fibers is exemplary 10 to 80% by mass, and also exemplary 10 to 50% by mass relative to a total sum of the second fibers and the third fibers. So long as the proportion of the third fibers falls within this range, the increase of pressure loss is liable to be suppressed.

In addition, as described previously, the total sum of the second fibers 2F and the third fibers 3F accounts for 95% by mass or more of the whole in the second nonwoven fabric 2. Namely, the second nonwoven fabric 2 may include other fibers than the second fibers 2F and the third fibers 3F, for example, the first fibers 1F, or other fibers than the first fibers 1F, the second fibers 2F, the third fibers 3F, in an amount of less than 5% by mass. The other fibers than the first fibers 1F, the second fibers 2F, and the third fibers 3F are not particularly limited and can be properly selected.

A basis weight of the second nonwoven fabric 2 is exemplary 0.1 to 1.5 g/m$^2$, and also exemplary 0.3 to 1.1 g/m$^2$. So long as the basis weight of the second nonwoven fabric falls within this range, it becomes easy to arrange the second nonwoven fabric superimposed on the first nonwoven fabric without clogging the void S. For that reason, it is easy to hold the high dust collection efficiency while suppressing the increase of pressure loss. An initial pressure loss of the second nonwoven fabric is exemplary about 5 to 40 Pa.

[Protective Layer]

The laminated nonwoven fabric 10 may be provided with a protective layer for protecting the second nonwoven fabric on the side of the principal surface 2A. The protective layer is not particularly limited so long as it is porous, and examples thereof include nonwoven fabrics.

A material of the protective layer is not particularly limited, and for example, the same materials as those exemplified for the first fibers can be exemplified. In the case of performing the measurement with a measuring machine in conformity with the regulations of JIS B9908, Form 1, the initial pressure loss of the protective layer is exemplary about 1 to 10 Pa. So long as the initial pressure loss of the protective layer falls within this range, a pressure loss of the whole of the laminated nonwoven fabric is also suppressed, and therefore, an effect for unevenly distributing the second fibers, and moreover the third fibers is more liable to be exhibited.

From the viewpoint of pressure loss, an average thickness of the protective layer is exemplary 100 to 500 μm. A basis weight of the protective layer is exemplary 10 to 50 g/m$^2$, and also exemplary 10 to 30 g/m$^2$. In the case where the protective layer is constituted of fibers of a nonwoven fabric or the like, an average fiber diameter of the fibers is, for example, 0.5 μm to 20 μm.

[Production Method of Laminated Nonwoven Fabric]

The laminated nonwoven fabric 10 can be produced by, for example, an electrostatic spinning method or the like. In the electrostatic spinning method, the first nonwoven fabric as a target is grounded or negatively charged, and a solution (raw material liquid) having a positively-charged raw material of the second fibers dissolved therein is then injected thereinto from a nozzle. In a process in which the raw material liquid reaches the first nonwoven fabric, the solvent of the raw material liquid is vaporized, and the fibrous material (second fibers) of the raw material is accumulated on the first nonwoven fabric. Since the first nonwoven fabric and the second fibers pull against each other due to an electrostatic force, the second fibers are liable to be accumulated on the first fibers of the first nonwoven fabric.

Figure 7:
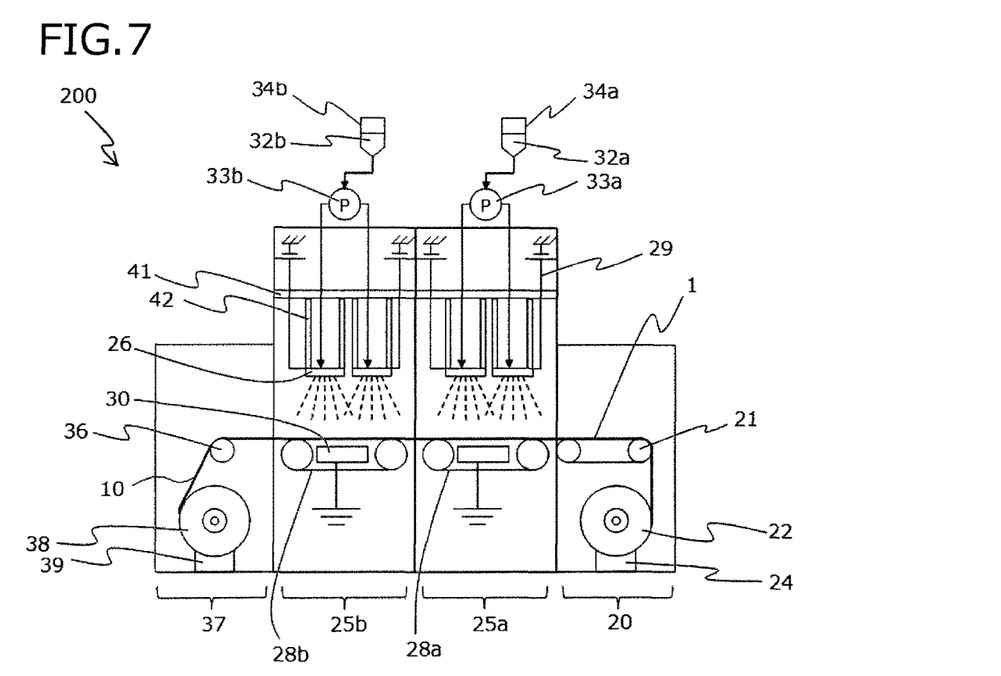
FIG. 7 is a view illustrating a configuration of an example of a production system of a laminated nonwoven fabric.

The production method the laminated nonwoven fabric 10 by adopting an electrostatic spinning method is hereunder specifically explained by reference to FIG. 7. FIG. 7 is a view diagrammatically illustrating a configuration of an example of a production system 200 of the laminated nonwoven fabric 10.

First of all, a first nonwoven fabric 1 including first fibers is prepared. The first nonwoven fabric 1 is produced using polymer or glass fibers for forming the first fibers, or the like by adopting a spun bonding method, a dry method (for example, an air-laid method), a wet method, a melt blow method, or the like. In the production system 200, the first nonwoven fabric 1 is conveyed from the upstream to the downstream of a production line.

In the most upstream of the production system 200, a first nonwoven fabric feeder 20 in which the first nonwoven fabric 1 wound in a roll state is accommodated therein is provided. The feeder 20 rotates a feed reel 22 by a motor 24 and feeds the first nonwoven fabric 1 wound around the feed reel 22 into a first conveyor 21.

The first nonwoven fabric 1 is transferred into an electrostatic spinning unit 25 by the conveyor 21. An electrostatic spinning mechanism included in the electrostatic spinning unit 25 includes a discharger 26 for discharging a raw material liquid, which is set in an upper portion of the apparatus; an electrostatic charging means (as described later) for positively charging the discharged raw material liquid; and a second conveyor 28 for conveying the first nonwoven fabric 1 from the upstream side into the downstream side, which is arranged opposite to the discharger 26. The second conveyor 28 functions as a collector for collecting not only the first nonwoven fabric 1 but also the second fibers 2F. The number of units of the electrostatic spinning unit 25 is two (25a and 25b) in FIG. 6; however, the number of units is not particularly limited, but it may be one or three or more.

A discharge outlet (not illustrated) of the raw material liquid is provided in plural places on the side opposing to the main plain of the first nonwoven fabric 1 of the discharger 26. Although a distance between the discharge outlet of the discharger 26 and the first nonwoven fabric 1 varies depending upon a scale of the production system, it has only to be, for example, 100 to 600 mm. The discharger 26 is supported by a second support 42 that extends downward from a first support 41 set in upper portions of the electrostatic spinning units 25a and 25b and in parallel to the conveyance direction of the first nonwoven fabric 1, in such a manner that its own longitudinal direction is parallel to the principal surface of the first nonwoven fabric 1.

The electrostatic charging means is configured of a voltage applying device 29 for applying a voltage to the discharger 26 and a counter electrode 30 set in parallel to the second conveyor 28 (28a and 28b). The counter electrode 30 is grounded. According to this, an electric potential difference (for example, 20 to 200 kV) corresponding to the voltage applied by the voltage applying device 29 can be provided between the discharger 26 and the counter electrode 30. The configuration of the electrostatic charging means is not particularly limited. For example, the counter electrode 30 may be negatively charged. In addition, a belt portion of the second conveyor 28 may also be constituted of a conductive matter in place of providing the counter electrode 30.

The discharger 26 is constituted of a conductive matter and has a lengthy shape, and its interior is hollow. The hollow portion serves as an accommodation portion for accommodating a raw material liquid 32 (32a and 32b) therein. The raw material liquid 32 is supplied from a raw material liquid tank 34 (34a and 34b) into a hollow portion of the discharger 26 by a pressure produced by a pump 33 (33a and 33b) communicating with the hollow portion of the discharger 26. Then, the raw material liquid 32 is discharged from the discharge outlet toward the principal surface of the first nonwoven fabric 1 by the pressure produced by the pump 33. The discharged raw material liquid causes electrostatic explosion to produce a fibrous material (second fibers) during the time when it moves in an electrostatically charged state in a space between the discharger 26 and the second conveyor 28. An average fiber diameter of the thus produced second fibers is, for example, less than 1 μm.

As described previously, since the first nonwoven fabric and the second fibers pull against each other due to an electrostatic force, the second fibers are preferentially accumulated in the neighborhood of the first fibers of the first nonwoven fabric. Furthermore, when the raw material liquid 32 is continued to be discharged, the second fibers are accumulated so as to be superimposed on the voids S. Namely, the laminated nonwoven fabric according to the present invention can be obtained by controlling the accumulation amount of the second fibers. Specifically, the laminated nonwoven fabric according to the present invention can be obtained by stopping the discharge of the raw material liquid 32 before when seen from the side of the principal surface 2A, the total area A2b of the second fibers 2Fb existing superimposed in the voids S becomes larger than the total area A2a of the second fibers 2Fa existing superimposed on the first fibers 1F.

Furthermore, in the case of accumulating the third fibers, for example, the electrostatic spinning unit 25b may be used for the purpose of accumulating the third fibers. In this case, the raw material liquid 32b of the third fibers is accommodated in the raw material tank 34b. The third fibers are first preferentially accumulated in the neighborhood of the first fibers of the first nonwoven fabric and subsequently accumulated so as to be superimposed on the voids S. For that reason, different from the case of the second fibers, the discharge of the raw material liquid 32b has only to be stopped after when seen from the side of the principal surface 2A, the total area A3b of the third fibers 3Fb existing superimposed on the voids S becomes larger than the total area A3a of the third fibers 3Fa existing superimposed on the first fibers 1F.

The average fiber diameter of the fibers to be accumulated can be changed by regulating a discharge pressure of the raw material liquid, an applied voltage, a concentration of the raw material liquid, a distance between the discharge outlet and the first nonwoven fabric 1, a temperature, a humidity, or the like. Discharge conditions may be set such that the average fiber diameter D3 of the third fibers satisfies a relation of (D2<D3<D1).

The laminated body including the first nonwoven fabric 1 and the second nonwoven fabric 2 (i.e., the laminated nonwoven fabric 10), which is conveyed from the electrostatic spinning unit 25, is collected by a collecting machine 37 arranged on the more downstream side via a conveying roller 36. The collecting machine 37 has therein a collecting reel 38 for winding up a membrane to be conveyed. The collecting reel 38 is rotationally driven by a motor 39.

The collected laminated nonwoven fabric 10 may be further provided for a step of laminating a protective layer. The protective layer is a nonwoven fabric produced by adopting, for example, a spun bonding method, a dry method (for example, an air-laid method), a wet method, a melt blow method, or the like. The laminated nonwoven fabric 10 and the protective layer are welded to each other by means of, for example, bonding with an adhesive, a heat treatment, or the like. Above all, a method of performing bonding with an adhesive is preferred from the standpoint that the initial pressure loss is easily reduced.

As a solvent which is contained in the raw material liquid of the second fibers and/or the third fibers, an appropriate solvent may be selected according to the kind of the polymer as the raw material. Examples of the solvent which can be used include methanol, ethanol, 1-propanol, 2-propanol, hexafluoroisopropanol, tetraethylene glycol, triethylene glycol, dibenzyl alcohol, 1,3-dioxolane, 1,4-dioxane, methyl ethyl ketone, methyl isobutyl ketone, methyl n-hexyl ketone, methyl n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, dimethyl phthalate, diethyl phthalate, dipropyl phthalate, methyl chloride, ethyl chloride, methylene chloride, chloroform, o-chlorotoluene, p-chlorotoluene, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylene, p-xylene, m-xylene, acetonitrile, tetrahydrofuran, N,N-dimethylformamide, N,N-dimethylacetamide (DMAc), dimethyl sulfoxide, pyridine, and water. These may be used solely or in combination of plural kinds thereof.

[Air Purifier]

An air purifier 100 of the present invention includes the laminated nonwoven fabric 10 to be used as a filter medium, a sucking section 60 of a gas, and a discharging section 61 of the gas. The laminated nonwoven fabric 10 is arranged between the sucking section 60 and the discharging section 61 such that the principal surface 2A is opposed to the sucking section 60 (see FIG. 8). The laminated nonwoven fabric 10 may be subjected to pleating in a pleated state and arranged.

Figure 8:
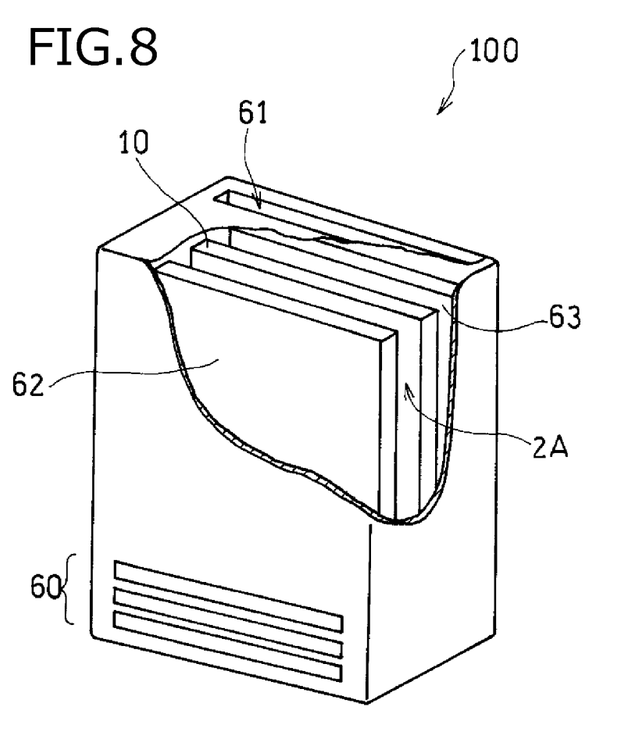
FIG. 8 is a cross-sectional view illustrating an air purifier according to an embodiment of the present invention.

The air purifier 100 takes the external air from the sucking section 60 into an interior of the air purifier 100. The taken air is subjected to dust collection during a time when it passes through the laminated nonwoven fabric 10 and the like, and the cleaned air is again discharged from the discharging section 61 into the outside.

The air purifier 100 may further include a pre-filter 62 for capturing a large dust or the like between the sucking section 60 and the laminated nonwoven fabric 10. In addition, the air purifier 100 may include a deodorizing filter 63 or a humidifying filter (not illustrated) between the laminated nonwoven fabric 10 and the discharging section 61.

EXAMPLES

The present invention is hereunder specifically explained by reference to the following Examples, but it should not be construed that the present invention is limited to these Examples.

[Evaluation Methods]

(1) Dust Collection Efficiency (Counting Method)

A laminated nonwoven fabric having a protective layer which had been electrostatically charged by an electrostatic spinning step was cut in a size of 12 cm·12 cm, thereby preparing a sample. This sample was allowed to suck a smoke generated resulting from burning of three cigarettes (MEVIUS (registered trademark), manufactured by Japan Tobacco Inc., tar content: 10 mg) and dusts in the air at a face velocity of 5.3 cm/sec (sucking test). A dust collection efficiency: $(1-C_1/C_0)\cdot 100(\%)$ was calculated while defining a concentration (number) of dusts (diameter: about 0.3 μm) in the air on the upstream side of the sample as $C_0$ and a concentration (number) of dusts (diameter: about 0.3 μm) on the downstream side of the sample as $C_1$, respectively. The number concentration was determined with an automatic particle counter by light scattering method. The above-described sucking test was continuously performed four times. The laminated nonwoven fabric was arranged while facing the second nonwoven fabric toward the upstream side.

(2) Pressure Loss

On the occasion of measuring the dust concentration as described above, both an air pressure $P_0$ on the upstream side of the sample and an air pressure $P_1$ on the downstream side of the sample were measured, thereby calculating a pressure loss $(P_0-P_1)$. For the measurement of the air pressure, a measuring machine (manometer) in conformity with the regulations of JIS B9908 was used.

Example 1

Figure 9:
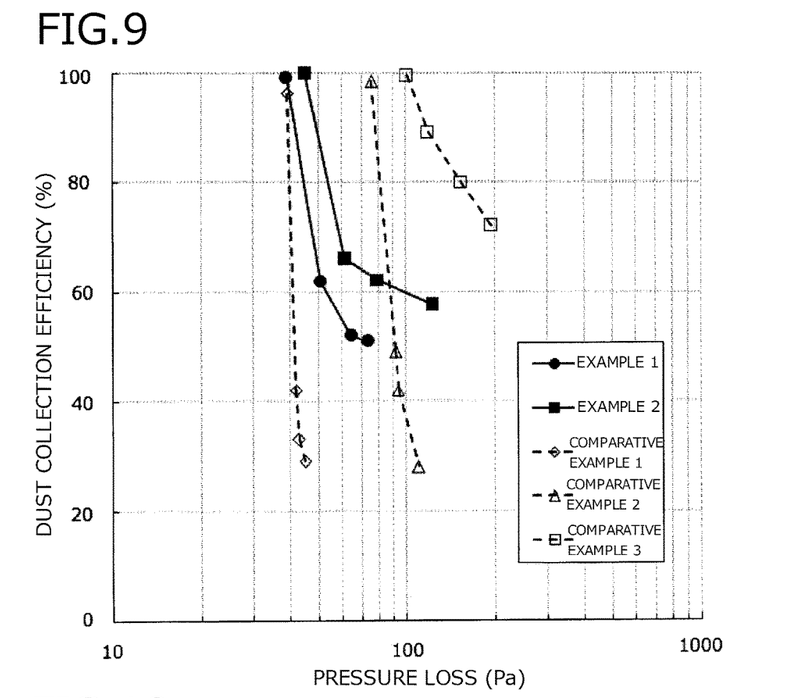
FIG. 9 is a graph illustrating evaluation results in the working examples.

A base material composed mainly of cellulose (thickness: 300 μm, D1: 15 μm, basis weight: 42 g/m², porosity: 61%) was used as a first nonwoven fabric. A second nonwoven fabric including second fibers was laminated on the first nonwoven fabric by the production system illustrated in FIG. 7, thereby fabricating a laminated nonwoven fabric. A DMAc solution containing 20% by mass of PES was used as a raw material liquid of the second fibers. D2 was 273 nm, and the second fibers were accumulated in an amount of 0.69 g/m² on the first nonwoven fabric. Furthermore, a melt blown nonwoven fabric (thickness: 152 μm, average fiber diameter: 5 μm, basis weight: 18 g/m²) as a protective layer was bonded onto the principal surface 2A with a powdery thermosetting adhesive. The evaluation results are illustrated in FIG. 9. The abscissa is a pressure loss, and the ordinate is a dust collection efficiency.

[Calculation of Areas A2a and A2b]

With respect to the laminated nonwoven fabric 10 prior to laminating the protective layer, a region R of 100 μm in square was photographed by using an electron microscope, and areas A2a and A2b were calculated according to the method as described above. As a result, A2a had a size of about 10 times of A2b. An electron microscope photograph is illustrated in FIG. 10.

Figure 10:
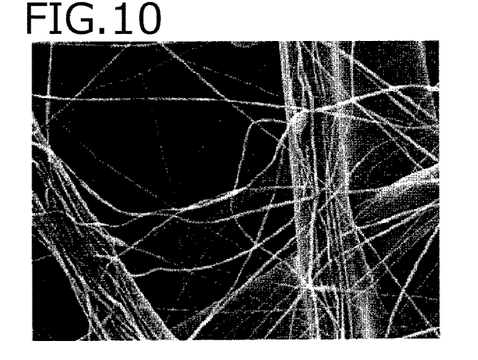
FIG. 10 is an electron microscope photograph of a laminated nonwoven fabric fabricated in Example 1.

In FIG. 10, thin threadlike portions appearing to be glistening are the second fibers, and threadlike portions of the same thickness, which are taken slightly dark, are the second fibers, too. In addition, portions thicker than the second fibers, which are taken slightly whitish, are the selected first fibers. Black portions surrounded by the first fibers were prescribed as the voids S.

[Calculation of Areas A2ap and A2av]

Portions 2Fap and 2Fav were specified according to the method as described above, and areas A2ap and A2av were calculated. As a result, A2ap had a size of about 7 times of A2av.

[Calculation of Proportions Rf and Rs]

Proportions Rf (Rfa+Rfb) and Rs were calculated according to the method as described above. As a result, Rfa was larger than Rfb, and Rf was about 3 times of Rs.

Example 2

A second nonwoven fabric including second fibers and third fibers was laminated on the same first nonwoven fabric as in Example 1 by the production system illustrated in FIG. 7, thereby fabricating a laminated nonwoven fabric. A basis weight (accumulation amount) of the second fibers was 0.67 g/m², and a basis weight (accumulation amount) of the third fibers was 0.35 g/m². A DMAc solution containing 20% by mass of PES was used as a raw material liquid of the second fibers. A DMAc solution containing 25% by mass of PES was used as a raw material liquid of the third fibers. D2 and D3 were regulated to 273 nm and 609 nm, respectively by changing the discharge conditions of the raw material liquid of the second fibers and the raw material liquid of the third fibers, respectively. Furthermore, a melt blown nonwoven fabric (thickness: 152 μm, average fiber diameter: 5 μm, basis weight: 18 g/m²) as a protective layer was bonded onto the principal surface 2A with a powdery thermosetting adhesive. The evaluation results are illustrated in FIG. 9.

As a result of calculation in the same manners as those in Example 1, A2a had a size of about 10 times of A2b; A2ap had a size of about 7 times of A2av; Rfa was larger than Rfb; and Rf was about 3 times of Rs. Furthermore, as a result of calculating areas A3a and A3b in the same manner, A3b had a size of about 4 times of A3a.

Comparative Example 1

Figure 11:
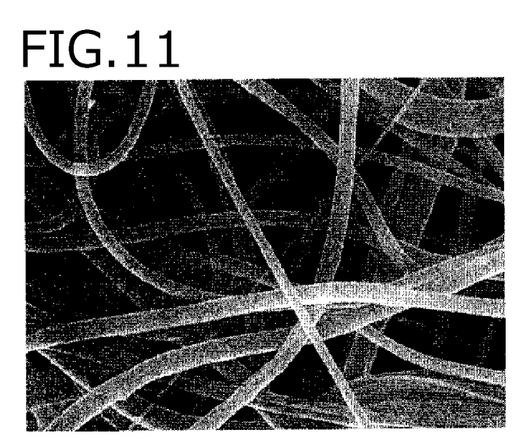
FIG. 11 is an electron microscope photograph of a laminated nonwoven fabric fabricated in Comparative Example 1.

The same first nonwoven fabric as in Example 1 was entangled with short fibers of polyester fibers (average fiber diameter: 5.3 μm) by a needle punch method, thereby fabricating a nonwoven fabric. A basis weight of the short fibers was 1.1 g/m². The evaluation results are illustrated in FIG. 9. As a result of calculation in the same manners as those in Example 1, A2a had a size of about 0.8 times of A2b; A2ap had a size of about 1.2 times of A2av; Rfa was smaller than Rfb; and Rf was about 0.6 times of Rs. An electron microscope photograph is illustrated in FIG. 11.

Comparative Example 2

The same first nonwoven fabric as in Example 1 was entangled with short fibers of polyester fibers (average fiber diameter: 5.3 μm) by a needle punch method, thereby fabricating a nonwoven fabric. A basis weight of the short fibers was 2.0 g/m². The evaluation results are illustrated in FIG. 9. As a result of calculation in the same manners as those in Example 1, A2a had a size of about 0.7 times of A2b; A2ap had a size of about 1.4 times of A2av; Rfa was smaller than Rfb; and Rf was about 0.5 times of Rs.

Comparative Example 3

PES fibers having an average fiber diameter of 295 nm were accumulated on the same first nonwoven fabric as in Example 1 in the same manner as that in Example 1. A basis weight (accumulation amount) of the PES fibers was set to 2.7 g/m². Furthermore, a melt blown nonwoven fabric (protective layer) was laminated on the principal surface 2A in the same manner as that in Example 1, thereby fabricating a laminated nonwoven fabric. The evaluation results are illustrated in FIG. 9. As a result of calculation in the same manners as those in Example 1, A2a had a size of about 0.2 times of A2b; A2ap had a size of about 1.2 times of A2av; Rfa was smaller than Rfb; and Rf was about 0.5 times of Rs.

In Comparative Examples 1 and 2, though the initial dust collection efficiency (at the first time) is high, in the sucking tests since the second time, the dust collection efficiency is largely lowered. Meanwhile, the pressure loss did not largely change. In Comparative Examples 1 and 2, since the short fibers are randomly entangled, the size of voids among the fibers is diverse. Although relatively small voids are clogged by the dust collection, voids larger than the former are held, and hence, the pressure loss does not largely increase. However, it may be considered that the dusts are liable to pass through large voids, and hence, the dust collection efficiency was lowered.

Meanwhile, in Examples 1 and 2, fibers smaller than the average fiber diameter are included, and hence, the dust collection efficiency was not largely lowered. In addition, the initial pressure loss was low, and even after the sucking test of the fourth time, the pressure loss was controlled low. In Comparative Example 3, since fibers which are smaller than the average fiber diameter are included, a lowering of the dust collection efficiency is suppressed. However, the initial pressure loss was large, and the pressure loss became large with a lapse of the sucking test.

According to the laminated nonwoven fabric of the present invention, even when used over a long period of time, the dust collection efficiency is high, and it is possible to suppress an increase of pressure loss; and therefore, it is applicable to air purifiers for household or office use requiring quietness. The application of the laminated nonwoven fabric of the present invention is not limited to the filter medium of air purifier. The laminated nonwoven fabric of the present invention is also applicable to other applications, for example, separating sheets for battery, in-vitro testing sheets, such as pregnancy testing sheets, and wiping sheets for wiping a dust.

The invention claimed is:

1. A laminated nonwoven fabric comprising:
a first nonwoven fabric that comprises first fibers; and
a second nonwoven fabric that comprises second fibers, the second nonwoven fabric being laminated on the first nonwoven fabric, the second nonwoven fabric having a first main surface and a second main surface that is opposite to the first main surface,
wherein the second main surface is in direct contact with the first nonwoven fabric,
wherein an average fiber diameter D1 of the first fibers and an average fiber diameter D2 of the second fibers satisfy a relation of D1>D2;
wherein viewed from the first main surface side of the second nonwoven fabric in a direction perpendicular to the first main surface, in a prescribed region that includes at least the first fibers and the second fibers in a view, a total area of first portions of the second fibers superimposed on the first fibers in the view is larger than a total area of second portions of the second fibers superimposed on voids S of the first nonwoven fabric in the view, the voids S being an area that is not covered by the first fibers; and
wherein among the first portions of the second fibers, a total area of portions of the second fibers arranged along a length direction of the first fibers is larger than a total area of portions of the second fibers arranged along a direction perpendicular to the length direction of the first fibers.

2. The laminated nonwoven fabric according to claim 1, wherein the average fiber diameter D1 of the first fibers and the average fiber diameter D2 of the second fibers satisfy a relation of D2≤D1/10.

3. The laminated nonwoven fabric according to claim 1, wherein the average fiber diameter D2 of the second fibers is less than 1 μm.

4. The laminated nonwoven fabric according to claim 1, wherein the second nonwoven fabric further comprises third fibers;
wherein an average fiber diameter D3 of the third fibers satisfies a relation of D2<D3<D1;
wherein the second fibers are arranged between the first fibers and the third fibers; and
wherein in viewed from the first main surface side of the second nonwoven fabric in the direction perpendicular to the first main surface, in a prescribed region that includes at least the first fibers, the second fibers, and the third fibers in a view, a total area of portions of the third fibers superimposed on the first fibers is smaller than a total area of portions of the third fibers superimposed on the voids S of the first nonwoven fabric in the view.

5. The laminated nonwoven fabric according to claim 4, wherein the average fiber diameter D2 of the second fibers is 100 nm or more and less than 500 nm, and the average fiber diameter D3 of the third fibers is 500 nm or more and less than 1,000 nm.

6. The laminated nonwoven fabric according to claim 1, further comprising:
a porous protective layer provided on the first main surface of the second nonwoven fabric.

7. An air purifier comprising:
a sucking section for sucking gas;
a discharging section for discharging the gas; and
the laminated nonwoven fabric according to claim 1,
wherein the laminated nonwoven fabric is arranged between the sucking section and the discharging section so that the first main surface of the second nonwoven fabric is opposed to the sucking section.

8. A laminated nonwoven fabric comprising:
a first nonwoven fabric that comprises a plurality of first fibers; and
a second nonwoven fabric that comprises a plurality of second fibers, the second nonwoven fabric having a bottom surface that is being laminated on top of the first nonwoven fabric and a top surface that is opposite to the bottom surface;
wherein an average fiber diameter $D1$ of the first fibers and an average fiber diameter $D2$ of the second fibers satisfy a relation of $D1>D2$,
wherein a prescribed region is defined as an area of the laminated nonwoven fabric viewed from a direction perpendicular to the top surface of the second nonwoven fabric, and the prescribed region is a square having a side of about 5 to 10 times of the length of $D1$,
wherein selected first fibers are defined as first fibers that have at least one distinct outer edge inside the prescribed region,
wherein a void S is defined as the regions inside the prescribed region that are not covered by the selected first fibers,
wherein inside the prescribed region, a first region of second fibers is formed by second fibers that are either superimposed on or next to the selected first fibers, and a second region of second fibers is formed by second fibers that are superimposed on the voids S,
wherein the total area of the first region of second fibers is larger than the total area of the second region of second fibers; and
wherein in the first region of second fibers, a total area of the second fibers arranged along a length direction of respective selected first fiber is larger than a total area of the second fibers arranged along a direction perpendicular to the length direction of respective selected first fibers.

9. The laminated nonwoven fabric of claim 8, wherein the second nonwoven fabric further comprises third fibers;
wherein an average fiber diameter $D3$ of the third fibers satisfies a relation of $D2<D3<D1$; and
wherein the second fibers are arranged between the first fibers and the third fibers; and
wherein in the prescribed region, a first region of the third fibers is formed by the third fibers that are either superimposed on or next to the selected first fibers, and a second region of the third fibers is formed by the third fibers that are superimposed on the voids S, and
wherein the total area of the first region of the third fibers in a view is smaller than the total area of the second region of the third fibers in the view.

10. The laminated nonwoven fabric of claim 8, wherein the total area of the first region of second fibers is two times larger than the total area of the second region of second fibers.

11. The laminated nonwoven fabric of claim 8, wherein the total area of the first region of second fibers is seven times larger than the total area of the second region of second fibers.

* * * * *